(12) United States Patent
Khatri et al.

(10) Patent No.: US 8,370,534 B2
(45) Date of Patent: Feb. 5, 2013

(54) HOST-BASED MESSAGING FRAMEWORK FOR PCIE DEVICE MANAGEMENT

(75) Inventors: Mukund P. Khatri, Austin, TX (US); Surender V. Brahmaroutu, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 61 days.

(21) Appl. No.: 12/630,183

(22) Filed: Dec. 3, 2009

(65) Prior Publication Data

US 2011/0138082 A1 Jun. 9, 2011

(51) Int. Cl.
*G06F 3/00* (2006.01)
*G06F 9/00* (2006.01)

(52) U.S. Cl. ............... 710/8; 710/9; 710/10; 710/11; 710/12; 710/13; 710/14; 710/104; 713/1; 713/2; 713/100

(58) Field of Classification Search .................. None
See application file for complete search history.

(56) References Cited

U.S. PATENT DOCUMENTS

| | | | | |
|---|---|---|---|---|
| 5,717,853 | A * | 2/1998 | Deshpande et al. | 709/222 |
| 6,826,632 | B1 * | 11/2004 | Wugofski | 710/8 |
| 6,879,347 | B1 * | 4/2005 | French | 348/473 |
| 7,130,935 | B2 * | 10/2006 | Sauber | 710/38 |
| 2006/0123137 | A1 * | 6/2006 | DeHaemer et al. | 710/2 |
| 2008/0005372 | A1 * | 1/2008 | Bolen et al. | 710/8 |
| 2008/0046628 | A1 * | 2/2008 | Hunsaker et al. | 710/315 |
| 2008/0209246 | A1 * | 8/2008 | Marks et al. | 713/323 |
| 2008/0215868 | A1 * | 9/2008 | Lee et al. | 713/1 |
| 2008/0235363 | A1 * | 9/2008 | Shah | 709/223 |
| 2008/0307273 | A1 * | 12/2008 | Nguyen et al. | 714/704 |
| 2009/0003335 | A1 | 1/2009 | Biran et al. | |
| 2009/0019278 | A1 * | 1/2009 | Shah et al. | 713/100 |
| 2009/0083760 | A1 * | 3/2009 | Slaight | 719/313 |
| 2009/0172240 | A1 * | 7/2009 | Slaight | 710/313 |
| 2009/0271600 | A1 * | 10/2009 | Joshi et al. | 713/2 |
| 2010/0017796 | A1 * | 1/2010 | Walker et al. | 717/174 |
| 2010/0125653 | A1 * | 5/2010 | Cherian et al. | 709/223 |
| 2010/0180110 | A1 * | 7/2010 | Mittapalli et al. | 713/100 |
| 2011/0047365 | A1 * | 2/2011 | Hentosh et al. | 713/1 |

OTHER PUBLICATIONS

System Management BIOS Reference Specification, DSP0134, Version 2.6, Sep. 4, 2008.*
Systems Management Architecture for Mobile and Desktop Hardware, DSP 2014, Cersion 1.1.0, Dec. 2007.*

* cited by examiner

*Primary Examiner* — Henry Tsai
*Assistant Examiner* — Jing-Yih Shyu
(74) *Attorney, Agent, or Firm* — Larson Newman, LLP

(57) ABSTRACT

A method of routing data in an information handling system can include receiving a notification from a management controller at a basic input/output system (BIOS) that includes a system management interrupt (SMI) handler. The a notification can indicate that the management controller has a data packet bound for a peripheral component interconnect express input/output (PCIe I/O) device coupled to a secondary processor. The method can include generating a system management interrupt at the information handling system via the BIOS SMI handler in response to the notification. The method can also include retrieving the data packet from the management controller via the BIOS SMI handler and sending a payload associated with the data packet from the BIOS SMI handler to the PCIe I/O device.

17 Claims, 5 Drawing Sheets

HOST-BASED MESSAGING FRAMEWORK FOR PCIE DEVICE MANAGEMENT

FIELD OF THE DISCLOSURE

This disclosure relates generally to information handling systems, and relates more particularly to a host based messaging framework for PCIe device management.

DESCRIPTION OF RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of particular embodiments. Embodiments incorporating teachings of the present disclosure are illustrated and described with respect to the drawings presented herein.

The use of the same reference symbols in different figures indicates similar or identical items.

DETAILED DESCRIPTION

Figure 1:
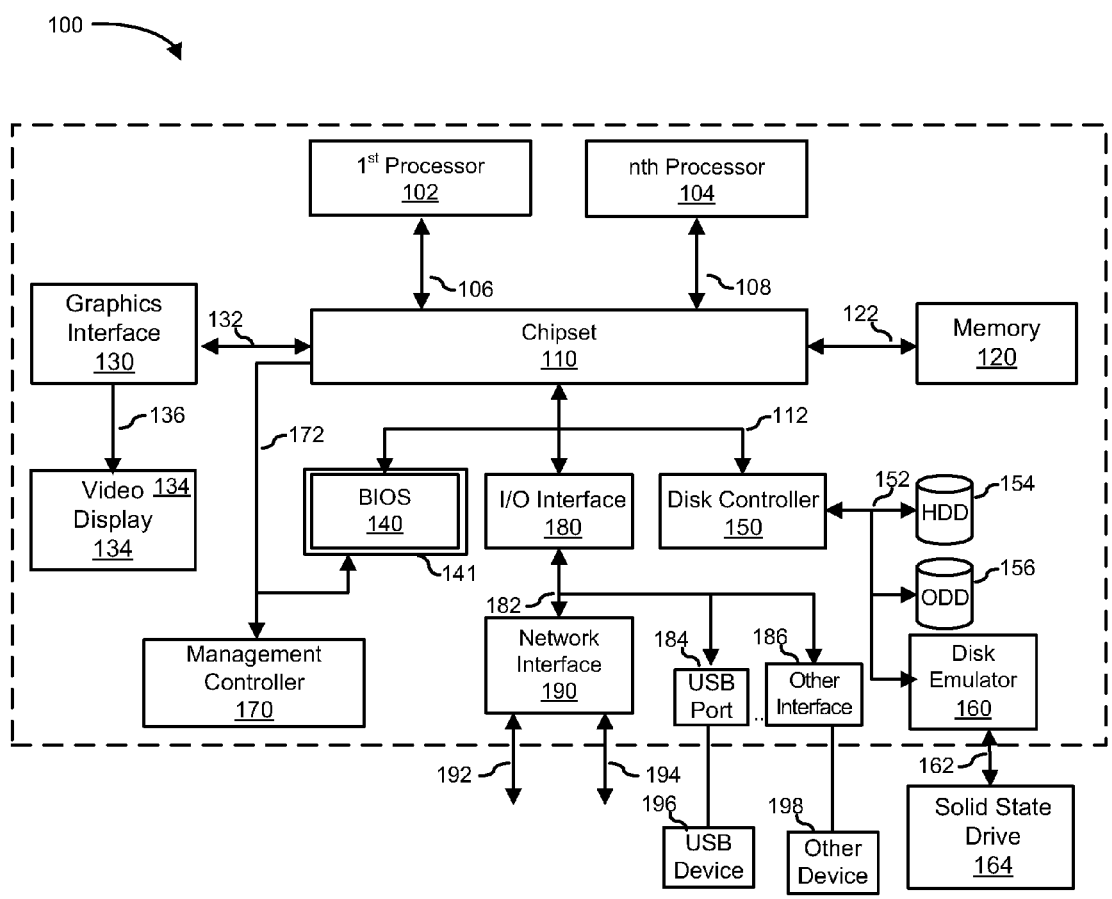
FIG. 1 includes a block diagram of a particular embodiment of an information handling system including a basic input/output system and a main circuit board control module.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random access memory, nonvolatile, such as read only memory or flash memory, or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (such as actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

FIG. 1 illustrates a functional block diagram of an exemplary embodiment of an information handling system, generally designated as 100. The information handling system 100 can include a processor 102 coupled to a host bus 106, and can further include one or more additional processors, generally designated as an $n^{th}$ processor 104, coupled to a host bus 108. The processor 102 can be coupled to a chipset 110 via the host bus 106 and the $n^{th}$ processor 104 can be coupled to the chipset 110 via the host bus 108.

The chipset 110 can support the processors 102 through 104, allowing for simultaneous processing by the processors 102 through 104, and can support the exchange of information within the information handling system 100 during multiple processing operations. In an aspect, the chipset 110 can function to provide access to the processor 102 using host bus 106, and the $n^{th}$ processor 104 using the host bus 108. In another aspect, the chipset 110 can include a dedicated bus (not illustrated) to transfer data between the processor 102 and the $n^{th}$ processor 104. In a particular embodiment, a processor, such as the processor 102, can be designated (at the BIOS 140, at the management controller 170, at another element of the system 100, or any combination thereof) as a primary processor, and a primary processor domain can be associated with the processor 102. Another processor, such as the processor 104, can be designated as a secondary processor, and a secondary processor domain can be associated with the processor 104.

The information handling system 100 can include a memory 120 coupled to a memory bus 122. In accordance with an aspect, the chipset 110 can be referred to as a memory hub or a memory controller, where the memory 120 can be coupled to the chipset 110 via the memory bus 122. For example, the chipset 110 can include an Accelerated Hub Architecture (AHA) enabled-chipset that can include a memory controller hub and an I/O controller hub. As a memory controller hub, the chipset 110 can be coupled to the host buses 106 through 108, and the memory bus 122 as individual buses, or as part of the same bus (not illustrated). The chipset 110 can also provide bus control and can handle transfers between the host buses 106 through 108, and the memory bus 122. In accordance with another aspect (not illustrated), the information handling system can include a separate memory dedicated to each processor 102 through 104. Each memory can include a memory bus coupled between each processor 102 through 104 and its dedicated memory. In accordance with yet another aspect, the chipset 110 can be generally considered an application specific chipset that provides connectivity to various buses, and integrates other system functions. For example, the chipset 110 can be provided using a chipset that includes two parts: a Graphics and Memory Controller Hub (GMCH) and an I/O Controller Hub (ICH). The chipset 110 can also be packaged as an ASIC.

The information handling system 100 can also include a graphics interface 130 that can be coupled to the chipset 110 using a graphics bus 132. The graphics interface 130 can provide a video display output 136 to a video display 134. In one form, the graphics interface 130 can be an Accelerated Graphics Port (AGP) interface to display content within the video display 134. Other graphics interfaces (not illustrated) may also be used in addition to the graphics interface 130 if needed or desired. The video display 134 can include one or more types of video displays, such as a flat panel display or other type of display device.

The information handling system 100 can also include an I/O channel 112 connected to the chipset 110. The I/O channel 112 can include a Peripheral Component Interconnect (PCI) bus, a PCI-Extended (PCI-X) bus, a high-speed link of PCI-Express (PCIe) lanes, another industry standard or proprietary bus or link, or any combination thereof. PCI buses, PCI-X buses, and PCIe links can be provided to comply with industry standards for connecting and communicating between various PCI, PCI-X and PCIe enabled hardware devices, respectively. The chipset 110 can include other buses in association with, or independent of, the I/O channel 112, including other industry standard buses (such as Industry Standard Architecture (ISA), Small Computer Serial Interface (SCSI), Inter-Integrated Circuit (I$^2$C), System Packet Interface (SPI), or Universal Serial Bus (USB), proprietary buses) or any combination thereof.

In an alternate embodiment, the chipset 110 can be a chipset employing a Northbridge/Southbridge chipset configuration (not illustrated). For example, a Northbridge portion of the chipset 110 can communicate with the processors 102 through 104 using the host buses 106 through 108, and can control interaction with the memory 120, the I/O channel 112, and activities for the video graphics interface 130. The chipset 110 can also include a Southbridge portion (not illustrated) of the chipset 110, and can handle I/O functions of the chipset 110. The Southbridge portion can manage basic forms of I/O, such as USB, serial I/O, audio outputs, Integrated Drive Electronics (IDE), ISA I/O, or any combination thereof for the information handling system 100.

The information handling system 100 can also include a basic input/output system (BIOS) module 140 that can be coupled to the I/O channel 112. The BIOS module 140 can include BIOS code operable to detect and identify resources within the information handling system 100, provide the appropriate drivers for those resources, initialize those resources, and access those resources. The BIOS code can include a system management interrupt (SMI) handler. The SMI handler is resident in system BIOS and runs underneath the running operating cycles by switching into System Management Mode (SMM), a special operational mode of x86 CPUs that is triggered by an SMI event. The BIOS module 140 can be operable during a boot sequence and provide information needed to properly boot the information handling system 100 before, during, and after an operating system for the information handling system is launched. In a particular embodiment, the BIOS module 140 can be included in a persistent memory 141, such as a FLASH memory device, a non-volatile random access memory (NVRAM) device, a complementary metal-oxide semiconductor (CMOS) memory device, another persistent memory device or any combination thereof.

In one embodiment, the I/O channel 112 can include a plurality of PCIe links. A particular PCIe link can be associated with the primary processor, and another PCIe link can be associated with the secondary processor. A processor is considered primary when it has a management controller attached to it directly, while all other processors are considered secondary. A PCIe I/O device communicating over the particular PCIe link can be registered by the BIOS 140 in association with the primary processor, and a PCIe I/O device communicating over the other PCIe link can be registered by the BIOS 140 in association with the secondary processor.

The information handling system 100 can further include a disk controller 150 coupled to the I/O channel 112. The disk controller 150 can include a disk interface 152 that can include other industry standard buses (such as Integrated Drive Electronics (IDE), Parallel Advanced Technology Attachment (PATA), Serial Advanced Technology Attachment (SATA), SCSI, or USB or proprietary buses), or any combination thereof. The disk controller 150 can be coupled to one or more disk drives via the disk interface 152. Such disk drives include a hard disk drive (HDD) 154 or an optical disk drive (ODD) 156 (such as a Read/Write Compact Disk (R/W-CD), a Read/Write Digital Video Disk (R/W-DVD), a Read/Write mini Digital Video Disk (R/W mini-DVD), or another type of optical disk drive), or any combination thereof. The optical disk drive 156 can read a removable data storage medium such as a Compact Disk (CD), a Digital Video Disk (DVD), a mini Digital Video Disk (mini-DVD), or other optical media. Additionally, the information handling system 100 can include a disk emulator 160 that is coupled to the disk interface 152. The disk emulator 160 can permit a solid-state drive 164 to be coupled to the information handling system 100 via an external interface 162. The external interface 162 can include other industry standard busses such as USB or IEEE 1394 (Firewire) or proprietary busses, or any combination thereof. Alternatively, the solid-state drive 164 can be disposed within the information handling system 100.

The information handling system 100 can further include a management controller 170, such as a management controller, that can be coupled to the chipset 110 via a system communication bus 172, such as a control bus. The management controller 170 may be on a main circuit board (such as a baseboard, a motherboard, or any combination thereof), integrated onto another component such as the chipset 110, in another suitable location, or any combination thereof. Although not illustrated, another resource, such as the processors 102 or 104, the memory 120, the graphics interface 130, the video display 134, the I/O interface 180, or the disk controller 150, or any combination thereof, can be coupled to the management controller 170. Commands, communications, or other signals may be sent to or received from the management controller 170 by any one or any combination of resources previously described. The management controller 170 can be part of an integrated circuit or a chip set within the information handling system 100.

The information handling system 100 can also include an I/O interface 180 that can be connected to the chipset 110 via the I/O channel 112. The I/O interface 180 can be coupled to a peripheral channel 182 that can be of the same industry standard or proprietary bus or link architecture as the I/O channel 112, or of a different industry standard or proprietary bus or link architecture than the I/O channel 112. As such, the 1/0 interface 180 can extend the I/O channel 112 capacity when the peripheral channel 182 is the same as the I/O channel 112, or translate information from a type suitable to the industry standard or proprietary bus or link architecture of the I/O channel 112 to a type suitable to a different industry standard or proprietary bus or link architecture, and vice versa, when the peripheral channel 182 is different than the I/O channel 112. Other I/O interfaces (not illustrated) may also be used in addition to the I/O interface 180, if needed or desired.

The peripheral channel 182 can include a bus structure that allows the installation and coupling of additional resources to the information handling system via interfaces 184 through 186, such as a universal serial bus (USB) port 184 and another interface 186, such as a PCI interface, an external serial ATA port, an SCSI port, a serial port, a parallel port, or another type of port. The ports 184 through 186 can be coupled to a main circuit board, on separate circuit boards or add-in cards disposed within the information handling system 100, to devices 196 through 198 that are external to the information handling system 100, or any combination thereof.

The information handling system 100 can also include a network interface device 190 that is coupled to the I/O interface 180 via the peripheral channel 182. The network interface device 190 may be a network interface card (NIC) disposed within the information handling system 100, on a main circuit board (such as a baseboard, a motherboard, or any combination thereof), integrated onto another component such as the chipset 110, in another suitable location, or any combination thereof. The network interface device 190 can include a network channel 192 and a network channel 194. The network interface device 190 can also include additional network channels (not illustrated).

In accordance with an aspect, the network channels 192 and 194 can be of a different industry standard or proprietary bus or link architecture than the peripheral channel 182, and the network interface device 190 can translate information from a type suitable to the industry standard or proprietary bus or link architecture of the peripheral channel 182 to a type suitable to the industry standard or proprietary bus or link architecture of the network channels 192 and 194, and vice versa. The network channels 192 and 194 can be of industry standard architecture (such as InfiniBand, Fibre Channel, or Gb Ethernet), proprietary channel architecture, or any combination thereof. Other network interface devices (not illustrated) may also be used in addition to the network interface device 190, if needed or desired. The network channels 192 and 194 can be coupled to network resources (not illustrated). The network resource can include another information handling system, a data storage system, another network, a grid management system, another suitable resource or any combination thereof.

In a particular illustrative embodiment, the processor 102 can be designated at the BIOS 140 as a primary processor at the information handling system 100, and the processor 104 can be designated as a secondary processor. The BIOS 140 can be configured to detect a PCIe I/O device, such as the disk controller 150, communicating with the processor 104 via the I/O channel 112, and the BIOS 140 can be configured to register the device in association with the processor 104. In a particular embodiment, the BIOS 140 can be configured to select a specific PCIe capability identifier corresponding to host based messaging, as opposed to Management Component Transport Protocol (MCTP)-over-PCIe vendor-defined messaging (VDM), in the PCIe I/O device.

MCTP is an industry standard designed to support communications between different devices and the management controller facilitating monitoring and control management functions inside a server system. The PCI and PCIExpress specifications include the notion of a PCI capability ID to report PCIe device specific capabilities, pointed to by capabilities pointer. In the present disclosure, the PCIe I/O device that supports this host based messaging (used by the I/O device off of the non-primary CPU)—in addition to the MCTP-over-PCIe VDM mechanism (used by I/O devices off of the primary CPU)—have the additional PCIe capability ID defined for reporting and enabling the host based VDM feature. BIOS, as part of platform initialization, picks and enables this capability selectively—versus PCIe VDM capability—depending on where the I/O device is located. While the present disclosure refers to host based VDM to be used on I/O off of the second socket, it should be appreciated that the I/O may be configured off of all of the CPUs to be configured for host based messaging.

The management controller 170 can be configured to determine whether the target PCIe I/O device is associated with the processor 102. If so, the management controller 170 can be configured to deliver the data packet to the target PCIe I/O device. For instance, the management controller 170 can be configured to send the data packet to the PCIe I/O device via an MCTP-over-PCIe protocol. The management controller packetizes data targeted for a device into one or more MCTP packets and sends them over the PCIe link.

Conversely, if the management controller 170 determines that the target PCIe I/O device is not associated with the primary processor 102, the management controller 170 can send a notification to the BIOS 140 indicating that the BIOS SMI handler is to generate an SMI at the information handling system 100. In an illustrative embodiment, sending the notification can include toggling an event at a BIOS SMI handler to a particular status, where the BIOS SMI handler is configured to generate the SMI when the event is toggled to the particular status.

The BIOS SMI handler can be configured to receive the notification from the management controller 170 indicating that the management controller has a packet bound for a PCIe I/O device associated with the processor 104. The BIOS SMI handler can be configured to generate an SMI in response to the notification. The BIOS SMI handler can be configured to, retrieve the data packet from the management controller 170 and to send a payload of the data packet to the PCIe I/O device using, for example, the assigned PCIe capability identifier. In an illustrative embodiment, the BIOS SMI handler can be configured to copy the payload to a buffer at the PCIe I/O device and to assert a control register setting at the PCIe I/O device that causes firmware at the PCIe I/O device to consume the payload. The BIOS SMI handler can be configured to send a status message to the management controller 170 indicating delivery of the data packet, or a payload associated therewith, to the PCIe I/O device.

In another particular illustrative embodiment, the BIOS 140 can be configured to detect an event at the secondary processor 104. For instance, the disk controller 150 or another PCIe I/O device can assert the event, such as any interrupt, at the secondary processor 104 after uploading a VDM packet or another data packet from a data source. In response to detecting the event, the BIOS 140 can be configured to query a buffer, a control register, or both, at the PCIe I/O device to determine the presence of the data packet. After determining the presence of the data packet at the PCIe I/O device, the BIOS SMI handler can be configured to generate an SMI. Further, the BIOS SMI handler can be configured to retrieve the data packet from the PCIe I/O device. The BIOS SMI handler can be configured to send a payload of the data packet to the management controller 170.

In a particular embodiment, the management controller 170 can be configured to send the data packet to another PCIe I/O device that is associated with the primary processor 102. In another particular embodiment, the management controller 170 can send the data packet to another PCIe I/O device that is associated with another secondary processor, as described herein.

The BIOS SMI handler can be configured to send a status message to the PCIe I/O device from which the data packet was retrieved indicating delivery of the data packet, or a payload associated therewith, to the management controller, to another PCIe I/O device, or any combination thereof.

Figure 2:
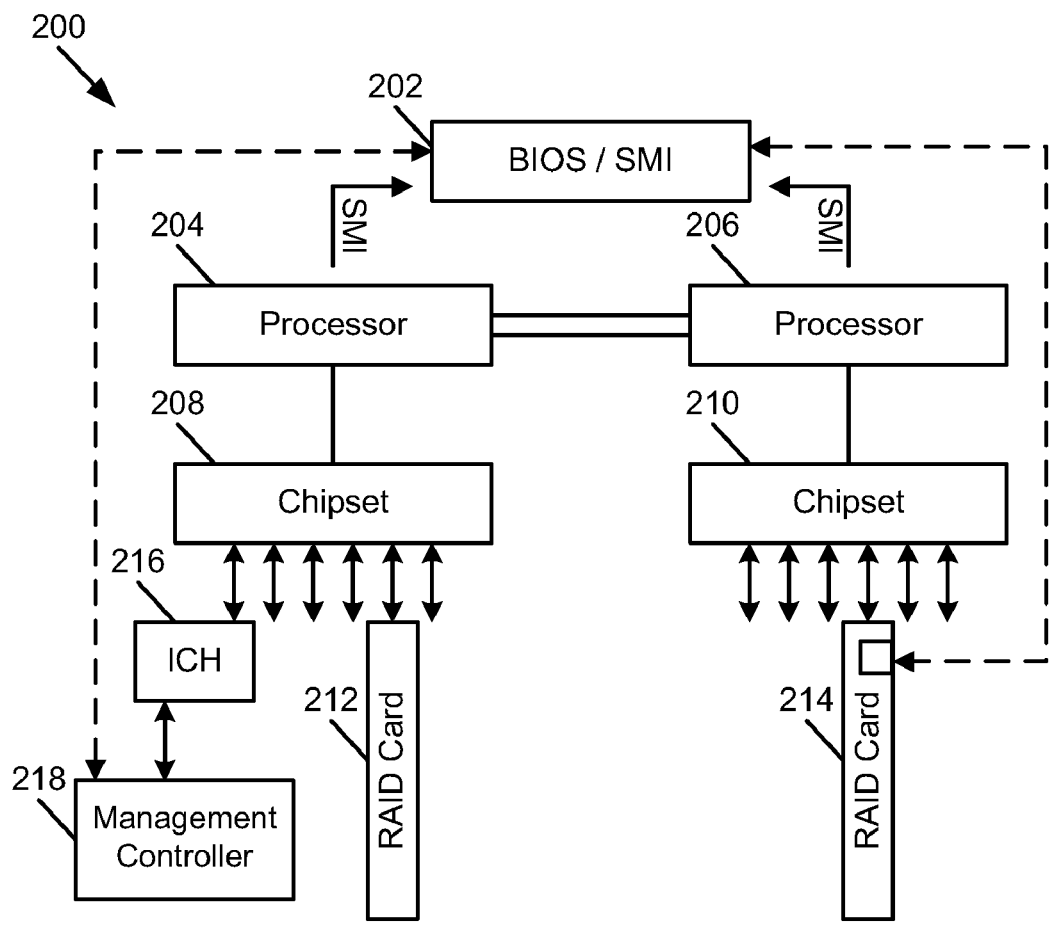
FIG. 2 includes a block diagram of another particular embodiment of an information handling system.

FIG. 2 illustrates another particular embodiment of an information handling system 200. The information handling system 200 can include a BIOS 202 having a system management interrupt (SMI) handler that runs on both a processor 204 and a processor 206. The processor 204 can communicate with a chipset 208 and the other processor 206 can communicate with another chipset 210. A PCIe I/O device, such as a redundant array of independent disks (RAID) controller card 212, can communicate with the processor 204 via the chipset 208. Another PCIe I/O device, such as another RAID controller card 214, can communicate with the processor 206 via the chipset 210. The BIOS 202 can also communicate with both RAID controller card 212 and with RAID controller card 214. Additionally, the BIOS 202 can communicate with a management controller 218. The management controller 218 can also communicate with an I/O controller hub (ICH) 216. The ICH can also communicate with the chipset 208.

In a particular illustrative embodiment, the processor 204 can be designated at the BIOS 202 as a primary processor at the information handling system 200, and the processor 206 can be designated as a secondary processor. The BIOS 202 can be configured to detect a PCIe I/O device, such as the RAID card 214, communicating with the processor 206, and the BIOS 202 can be configured to register the device in association with the processor 206. In a particular embodiment, the BIOS 202 can be configured to assign a PCIe capability identifier to the RAID card 214.

The management controller 218 can be configured to send a data packet, such as a VDM packet bound for a target PCIe I/O device. The management controller 218 can be configured to determine whether the target PCIe I/O device is associated with the processor 204. If so, the management controller 218 can be configured to deliver the data packet to the target PCIe I/O device, such as the RAID card 212. For instance, the management controller can be configured to send the data packet to the RAID card 212 via an MCTP-over-PCIe protocol.

Conversely, if the management controller 218 determines that the target PCIe I/O device is not associated with the primary processor 204, the management controller 218 can send a notification to the BIOS 202 indicating that the BIOS SMI handler is to generate an SMI. In an illustrative embodiment, sending the notification can include toggling an event at a BIOS SMI handler to a particular status, where the BIOS SMI handler is configured to generate the SMI when the event is toggled to the particular status.

The BIOS SMI handler can be configured to receive the notification from the management controller 218 indicating that the management controller has a packet bound for the RAID card 214. The BIOS SMI handler can be configured to generate an SMI in response to the notification. The BIOS SMI handler can be configured to retrieve the data packet from the management controller 218 and send a payload of the data packet to the RAID card 214 using, for example, the assigned PCIe capability identifier. In an illustrative embodiment, the BIOS SMI handler can be configured to copy the payload to a buffer at the target RAID card 214 and assert a control register setting that causes firmware at the RAID card 214 to consume the payload. The BIOS SMI handler can be configured to send a status message to the management controller 218 indicating delivery of the data packet, or a payload associated therewith, to the RAID card 214.

In another particular illustrative embodiment, the BIOS 202 can be configured to detect an event at the secondary processor 206. For instance, the RAID card 214 or another PCIe I/O device can upload a VDM packet or another data packet and assert the event at the secondary processor 206 after uploading the data packet. In response to detecting the event, the BIOS 202 can be configured to query a buffer, a control register, or both, at the PCIe I/O device to determine the presence of the data packet. After determining the presence of the data packet at the PCIe I/O device, the BIOS SMI handler can be configured to generate an SMI.

Further, the BIOS SMI handler can be configured to retrieve the data packet from the PCIe I/O device. The BIOS SMI handler can be configured to send a payload of the data packet to the management controller 218. In a particular embodiment, the management controller 218 can be configured to send the data packet to another PCIe I/O device that is associated with the primary processor 204. In another particular embodiment, the management controller 218 can send the data packet to another PCIe I/O device that is associated with another secondary processor. The BIOS SMI handler can be configured to send a status message to the PCIe I/O device from which the data packet was retrieved indicating delivery of the data packet, or a payload associated therewith, to the management controller, to another PCIe I/O device, or any combination thereof.

Figure 3:
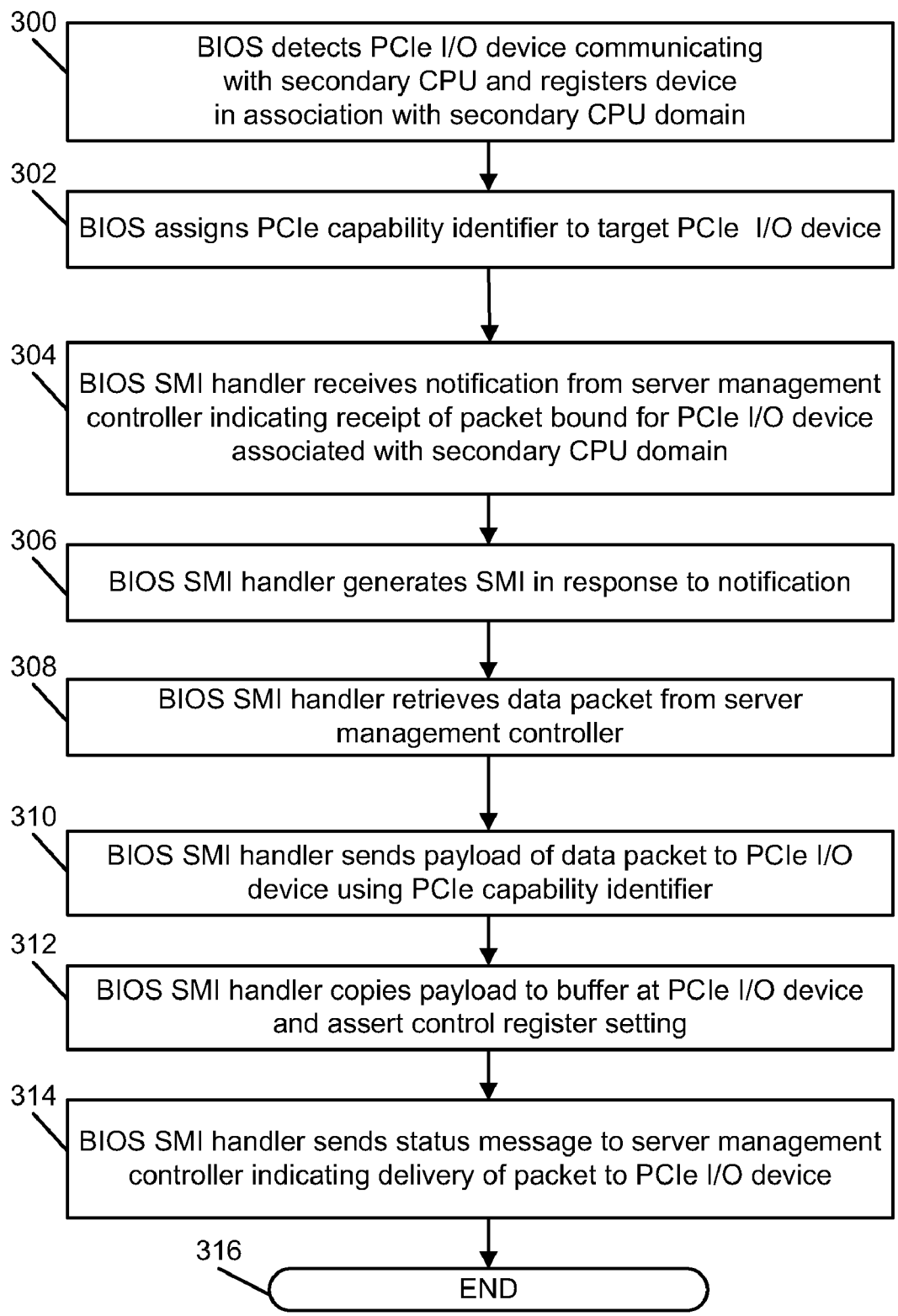
FIG. 3 includes a flow diagram illustrating a particular embodiment of a method of routing data in an information handling system.

FIG. 3 illustrates a particular embodiment of a method of routing data in an information handling system. At 300, a BIOS that includes an SMI handler detects a PCIe I/O device communicating with a secondary processor. The BIOS registers the device in association with a secondary processor. Moving to block 302, in a particular embodiment, the BIOS can assign a PCIe capability identifier to the PCIe I/O device. Proceeding to block 304, the BIOS SMI handler receives a notification from a management controller indicating that the management controller has received a packet bound for the target PCIe I/O device associated with the secondary processor. Continuing to block 306, the BIOS SMI handler generates an SMI in response to the notification.

Advancing to block 308, the BIOS SMI handler retrieves the data packet from the management controller. At block 310, the BIOS SMI handler sends a payload of the data packet to the PCIe I/O device using the PCIe capability identifier. In an illustrative embodiment, at block 312, the BIOS SMI handler can copy the payload to a buffer at the target PCIe I/O device and assert a control register setting that causes firmware at the PCIe I/O device to consume the payload. Moving to block 314, the BIOS SMI handler can send a status message to the management controller indicating delivery of the data packet, or a payload associated therewith, to the PCIe I/O device. The method terminates at 316.

Figure 4:
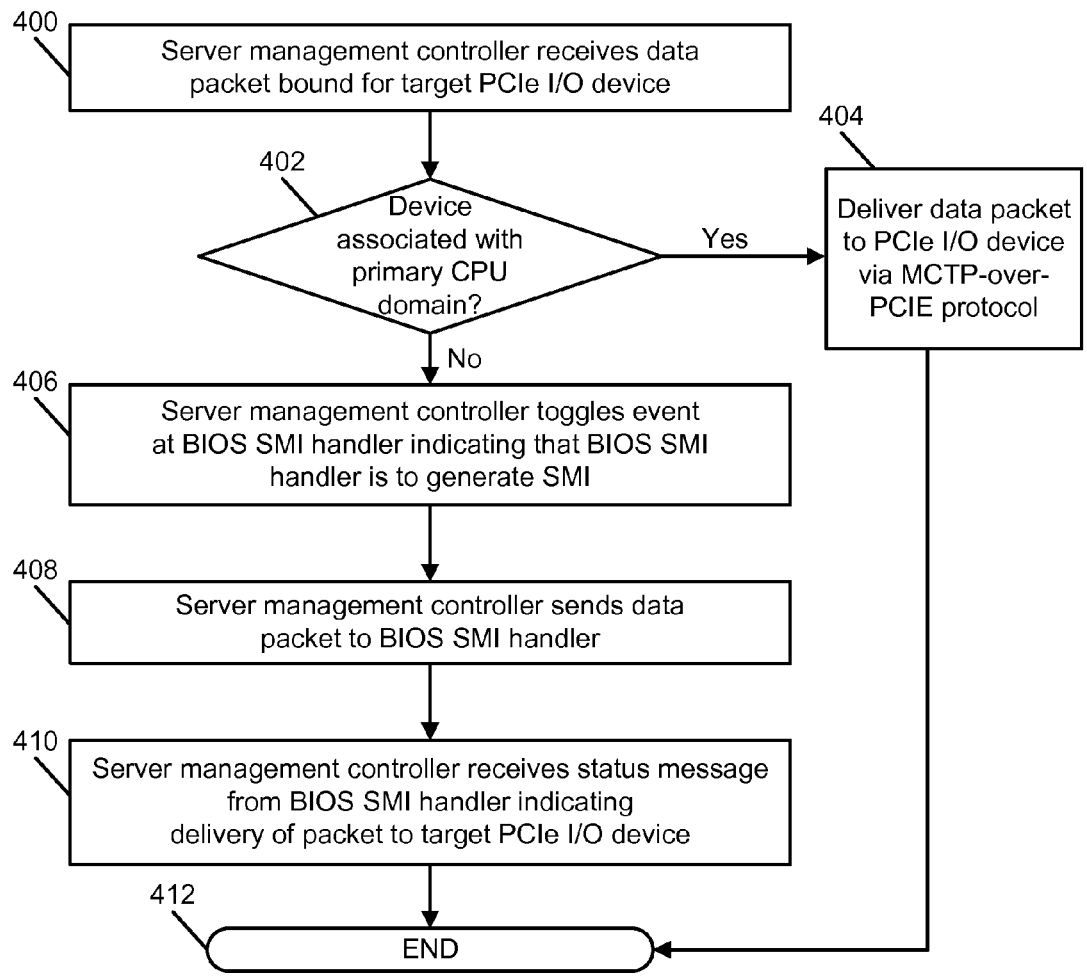
FIG. 4 includes a flow diagram illustrating another particular embodiment of a method of routing data in an information handling system.

FIG. 4 illustrates another particular embodiment of a method of routing data in an information handling system. At 400, a management controller receives a data packet bound for a target PCIe I/O device. Moving to block 402, the management controller determines whether the target PCIe I/O device is associated with a primary processor. If so, the method can proceed to block 404, and the management controller can deliver the data packet to the target PCIe I/O device, for instance, via an MCTP-over-PCIe protocol.

Conversely, if the management controller determines that the target PCIe I/O device is not associated with the primary processor, the method can proceed to block 406, and, in an illustrative embodiment, the management controller can toggle an event at a BIOS SMI handler indicating that the BIOS SMI handler is to generate an SMI. Continuing to block 408, the management controller can send the data packet to the BIOS SMI handler. Advancing to block 412, the management controller can receive a status message from the BIOS SMI handler indicating delivery of the data packet, or a payload associated therewith, to the target PCIe I/O device. The method terminates at 412.

Figure 5:
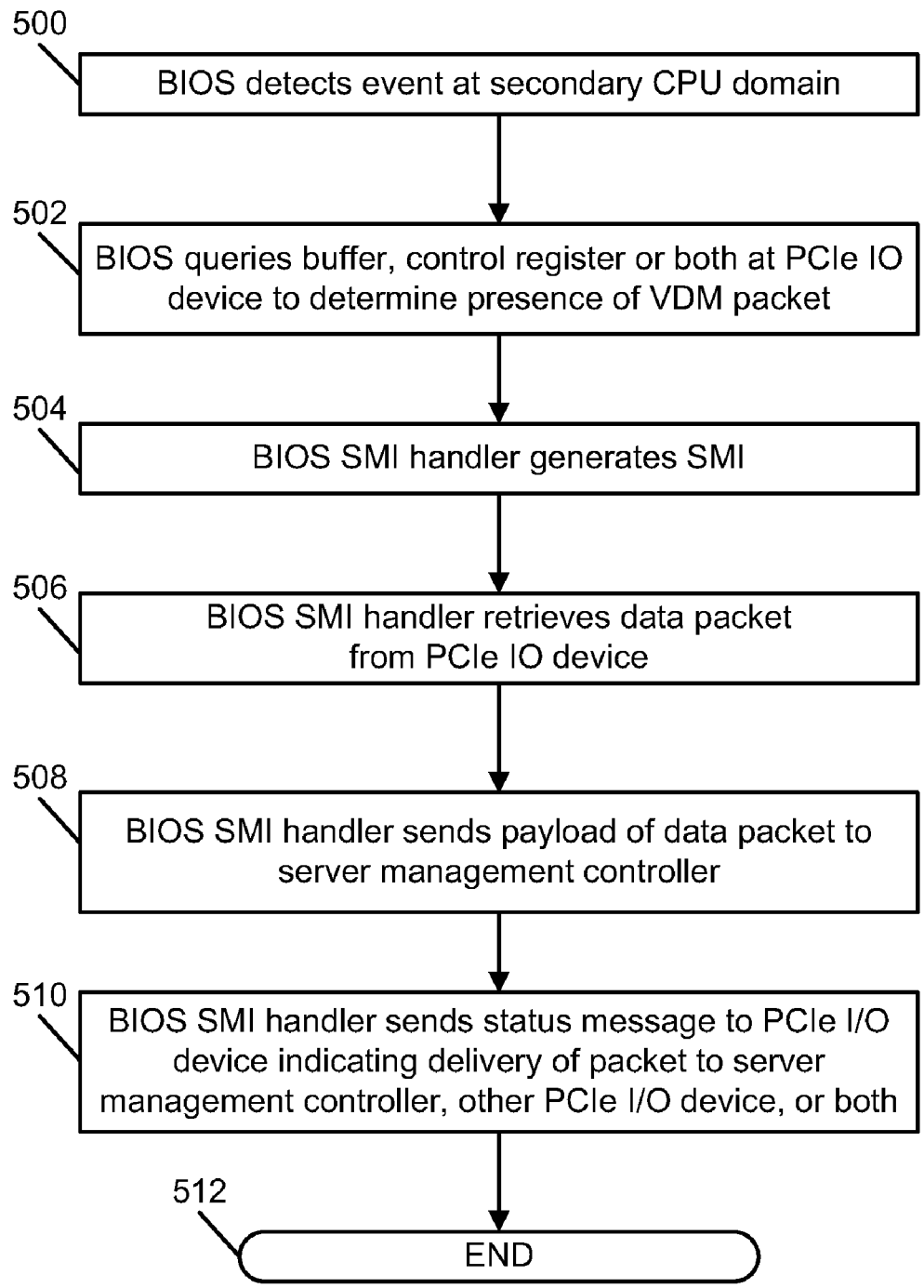
FIG. 5 includes a flow diagram illustrating an additional particular embodiment of a method of routing data in an information handling system.

FIG. 5 illustrates an additional embodiment of a method of routing data in an information handling system. At block 500, a BIOS that includes an SMI handler detects an event at a secondary processor. For instance, a PCIe I/O device can upload a VDM packet or another data packet and assert the event at the secondary processor. Moving to block 502, the BIOS can query a buffer, a control register, or both, at the PCIe I/O device to determine the presence of the data packet. Proceeding to block 504, the BIOS SMI handler generates an SMI.

Continuing to block 506, the BIOS SMI handler retrieves the data packet from the PCIe I/O device. Advancing to block 508, the BIOS SMI handler sends a payload of the data packet to a management controller. In a particular embodiment, the management controller can send the data packet to another PCIe I/O device that is associated with a primary processor. In another particular embodiment, the management controller can send the data packet to another PCIe I/O device that is associated with another secondary processor using, for example, the process described with reference to FIG. 4. At block 510, the BIOS SMI handler sends a status message to the PCIe I/O device from which the data packet was retrieved indicating delivery of the data packet, or a payload associated therewith, to the management controller, to another PCIe I/O device, or any combination thereof and the method ends at block 512.

In accordance with embodiments disclosed herein, a system and method of routing data in an information handling system are provided. In a particular embodiment, a notification can be received from a management controller at a BIOS system that includes an SMI handler. The a notification can indicate that the management controller has received a data packet bound for a target peripheral component interconnect express input/output (PCIe I/O) device coupled to a secondary processor. The BIOS SMI handler can generate a system management interrupt at the information handling system in response to the notification. The BIOS SMI handler can retrieve the data packet from the management controller and send a payload associated with the data packet from the BIOS SMI handler to the PCIe I/O device.

Manageability of I/O devices (such as health monitoring, reporting, firmware updates, device configuration and other functions) can be a critical aspect of system management for servers. Some current industry solutions approach manageability via proprietary in-band agents running either as operating system agents or pre-boot applications. Development and maintenance of such tools across operating systems and hypervisors can be burdensome for system administrators, as they can require continuous allocation of resources to keep up with new operating system and hypervisor paradigms. Additionally, such solutions must typically be applicable to out-of-band agents.

Particular embodiments of the systems and methods disclosed herein can provide comprehensive server management by enabling manageability of I/O devices via hardware interfaces between a platform management controller and each I/O device. Thus, existing PCIe links interconnects can be used by the management controller to send and receive PCIe messages to and from PCIe end points. This allows for operating system-agnostic management of devices, in which the contents of a VDM packet or similar data packet do not have to be interpreted before delivery to an intended device. Rather, a BIOS SMI messaging framework acts as a transport mechanism for delivering payloads between the management controller and an end I/O device.

After reading this specification, skilled artisans will appreciate the usefulness and flexibility of the method and system described herein. Configuration information can be exported from an information handling system and imported into the same or different information handling system before an operating system is launch or before a full function version of the operating system is launched. The configuration information can be edited before importation. Thus, the configuration information may be edited for different types or configurations of information handling systems before that particular configuration information is used. The information handling system may ignore or otherwise not use the imported configuration information to the extent such configuration information is not relevant to the particular information handling system. If the imported configuration information does not include a particular piece of configuration information, the information handling system may use a default value that already is present within the information handling system. Thus, the method and system are flexible in that they can be used for many different information handling system, for instances in which the imported configuration information does not have a corresponding component, and can be used when the information handling system includes a component in which the imported configuration information does not have a corresponding variable-value pair.

Many different aspects and embodiments are possible. Some of those aspects and embodiments are described below. After reading this specification, skilled artisans will appreciate that those aspects and embodiments are only illustrative and do not limit the scope of the present invention.

According to a first aspect, a method of routing data in an information handling system can include receiving a notification from a management controller at a basic input/output system (BIOS) that includes a system management interrupt (SMI) handler. The a notification can indicate that the management controller has received a data packet bound for a peripheral component interconnect express input/output (PCIe I/O) device coupled to a secondary processor. The method can include generating a system management interrupt at the information handling system via the BIOS SMI handler in response to the notification. The method can also include retrieving the data packet from the management controller via the BIOS SMI handler and sending a payload associated with the data packet from the BIOS SMI handler to the PCIe I/O device.

In an embodiment of the first aspect, the method can include determining at the BIOS that the PCIe I/O device is communicating with the secondary processor and registering the PCIe I/O device in association with the secondary processor.

In another embodiment of the first aspect, the method can assign a PCIe capability identifier to the PCIe I/O device at the BIOS. The method can also include further comprising sending the payload to the PCIe I/O device via the PCIe capability identifier.

In another embodiment of the first aspect, the data packet can include header information indicating that the data packet is bound for the PCIe I/O device.

In another embodiment of the first aspect, the data packet can include a VDM packet.

In another embodiment of the first aspect, sending the payload can include copying the payload to a buffer at the PCIe I/O device.

In another embodiment of the first aspect, the method can include asserting a control register setting, wherein firmware at the PCIe I/O device consumes the payload in response to the control register setting.

In another embodiment of the first aspect, the method can include sending a status message from the BIOS SMI handler to the management controller, the status message indicating that the payload has been delivered to the PCIe I/O device.

According to a second aspect, a method of routing data in an information handling system can include receiving a data packet at a management controller. The method can also include, when the data packet including information indicating that the data packet is bound for a PCIe I/O device associated with a secondary processor, sending a notification to a BIOS SMI handler. The notification indicates that the BIOS SMI handler is to generate a SMI at the information handling system. The method can also include sending the data packet to the BIOS SMI handler and receiving a status message from the BIOS SMI handler indicating that a payload associated with the data packet has been sent to the PCIe I/O device.

In an embodiment of the second aspect, the management controller can toggle an event at the BIOS, and the SMI can be generated in response to the event being toggled.

In another embodiment of the second aspect, the method can include, when the data packet includes information indicating that the data packet is bound for another PCIe I/O device associated with a primary processor, delivering the data packet from the management controller to the other PCIe I/O device.

In another embodiment of the second aspect, the management controller can be configured to deliver the data packet via a management control transport protocol (MCTP)-over-PCIe protocol According to a third aspect, a method can include detecting an event at a processor, the event indicating that a BIOS SMI handler is to generate a SMI. The method can also include querying a buffer, a control register, or any combination thereof, at a PCIe I/O device associated with a secondary processor to determine a presence of a VDM packet at the PCIe I/O device. The method can also include retrieving the VDM packet from the PCIe I/O device and delivering a payload associated with the VDM packet from the BIOS SMI handler to a management controller.

In an embodiment of the third aspect, the PCIe I/O device can generate the event at the processor in response to uploading the VDM packet from a source.

In another embodiment of the third aspect, the method can include sending a status message from the BIOS SMI handler to the PCIe I/O device. The status message indicates that the payload has been delivered to the management controller.

In another embodiment of the third aspect, the event at the processor can include a PCIe advanced error reporting event.

In another embodiment of the third aspect, the PCIe I/O device can include a RAID controller.

According to a fourth aspect, a computer-readable medium can include processor-readable instructions that are executable by a processor to perform a method. The method can include, receiving a notification from a management controller at a BIOS SMI handler, the notification indicating that the management controller has received a data packet bound for a PCIe I/O device coupled to a secondary processor; generating a system management interrupt at the information handling system via the BIOS SMI handler in response to the notification; retrieving the data packet from the management controller via the BIOS SMI handler; and sending a payload associated with the data packet from the BIOS SMI handler to the PCIe I/O device.

In an embodiment of the fourth aspect, the method can include detecting an event at the secondary processor, the event indicating that the BIOS SMI handler is to generate a SMI; querying a buffer, a control register, or any combination thereof, at a PCIe I/O device associated with a secondary processor to determine a presence of a VDM packet at the PCIe I/O device; retrieving the VDM packet from the PCIe I/O device; and delivering a payload associated with the VDM packet from the BIOS SMI handler to a management controller.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of routing data in an information handling system, the method comprising:
receiving at a management controller a first data packet bound for a first peripheral component interconnect express input/output (PCIe I/O) device communicating with a primary processor that is associated with a primary chipset;
sending the first data packet from the management controller to the first PCIe I/O device via a management component transfer protocol (MCTP)-over-PCIe protocol;
receiving a notification from the management controller at a basic input/output system (BIOS) that includes a system management interrupt (SMI) handler, the notification indicating that the management controller has sent a second data packet bound for a second PCIe I/O device communicating with a secondary processor that is associated with a secondary chipset;
determining at the BIOS that the second PCIe I/O device is communicating with the secondary processor;
registering the second PCIe I/O device in association with the secondary processor;
assigning a PCIe capability identifier to the second PCIe I/O device at the BIOS;
generating an SMI at the information handling system via the SMI handler in response to the notification;

retrieving the second data packet from the management controller via the SMI handler; and sending a payload associated with the second data packet from the SMI handler to the second PCIe I/O device, wherein the payload is sent to the second PCIe I/O device via the PCIe capability identifier.

2. The method of claim 1, wherein the second data packet includes header information indicating that the second data packet is bound for the second PCIe I/O device.

3. The method of claim 1, wherein the second data packet includes a PCIe vendor-defined messaging packet.

4. The method of claim 1, wherein sending the payload further comprises copying the payload to a buffer at the second PCIe I/O device.

5. The method of claim 4, further comprising asserting a control register setting, wherein firmware at the second PCIe I/O device consumes the payload in response to the control register setting.

6. The method of claim 1, further comprising sending a status message from the BIOS SMI handler to the management controller, the status message indicating that the payload has been delivered to the second PCIe I/O device.

7. A method of sending data in an information handling system, the method comprising:

receiving a data packet at a management controller;

when the data packet includes information indicating that the data packet is bound for a first peripheral component interconnect express input/output (PCIe I/O) device associated with a primary processor associated with a primary chipset, sending the data packet from the management controller to the first PCIe I/O device via a management component transfer protocol (MCTP)-over-PCIe protocol; and when the data packet includes information indicating that the data packet is bound for a second PCIe I/O device associated with a secondary processor associated with a secondary chipset:

determining at a basic input/output system (BIOS) that the second PCIe I/O device is communicating with the secondary processor;

registering the second PCIe I/O device in association with the secondary processor;

assigning a PCIe capability identifier to the second PCIe I/O device at the BIOS;

sending a notification to a BIOS system management interrupt (SMI) handler, the notification indicating that the BIOS SMI handler is to generate a SMI at the information handling system;

sending the data packet to the BIOS SMI handler; and receiving a status message from the BIOS SMI handler indicating that a payload associated with the data packet has been sent to the second PCIe I/O device.

8. The method of claim 7, wherein the management controller toggles an event at the BIOS and wherein the SMI is generated in response to the event being toggled.

9. The method of claim 7, wherein, in further response to the data packet including information indicating that the data packet is bound for the second PCIe I/O device, sending the data packet to a buffer at the second PCIe I/O device.

10. A method of sending data in an information handling system, the method comprising:

detecting a first event at a primary processor associated with a primary chipset, the first event indicating that a first peripheral component interconnect express input/output (PCIe I/O) device has a first vendor-defined messaging (VDM) packet for a management controller of the information handling system;

sending the first VDM packet to the management controller via a management component transfer protocol (MCTP)-over-PCIe protocol;

detecting a second event at a secondary processor associated with a secondary chipset, the second event indicating that a basic input/output system (BIOS) system management interrupt (SMI) handler is to generate a SMI;

querying a second PCIe I/O device associated with the secondary processor to determine a presence of a second VDM packet at the second PCIe I/O device that is communicating with the secondary processor, wherein the second PCIe I/O device is assigned a PCIe capability identifier at the BIOS;

retrieving the second VDM packet from the second PCIe I/O device via the PCIe capability identifier; and delivering a payload associated with the second VDM packet from the BIOS SMI handler to the management controller.

11. The method of claim 10, wherein the second PCIe I/O device generates the second event at the processor in response to uploading the second VDM packet from a source.

12. The method of claim 10, further comprising sending a status message from the BIOS SMI handler to the second PCIe I/O device, the status message indicating that the payload has been delivered to the management controller.

13. The method of claim 10, wherein the second event at the second processor comprises a PCIe advanced error reporting event.

14. The method of claim 10, wherein the second PCIe I/O device comprises a redundant array of independent disks (RAID) controller.

15. A non-transitory computer-readable medium including processor-readable instructions executable by a processor to perform a method, the method comprising:

receiving at a management controller a first data packet bound for a first peripheral component interconnect express input/output (PCIe I/O) device communicating with a primary processor associated with a primary chipset;

sending the first data packet from the management controller to the first PCIe I/O device via a management component transfer protocol (MCTP)-over-PCIe protocol;

receiving a notification from the management controller at a basic input/output system (BIOS) system management interrupt (SMI) handler, the notification indicating that the management controller has a second data packet bound for a second PCIe I/O device coupled to a secondary processor associated with a secondary chipset;

determining at the BIOS that the second PCIe I/O device is communicating with the secondary processor;

registering the second PCIe I/O device in association with the secondary processor;

assigning a PCIe capability identifier to the second PCIe I/O device at the BIOS;

generating an SMI at the information handling system via the BIOS SMI handler in response to the notification;

retrieving the second data packet from the management controller via the BIOS SMI handler; and sending a payload associated with the second data packet from the BIOS SMI handler to the second PCIe I/O device, wherein the payload is sent to the second PCIe I/O device via the PCIe capability identifier.

16. The non-transitory computer-readable medium of claim 15, wherein the method further comprises:
   detecting an event at the secondary processor, the event indicating that the BIOS SMI handler is to generate a SMI;
   querying the second PCIe I/O device to determine a presence of a vendor-defined messaging (VDM) packet at the second PCIe I/O device;
   retrieving the VDM packet from the second PCIe I/O device; and
   delivering a payload associated with the second VDM packet from the BIOS SMI handler to the management controller.

17. The non-transitory computer readable medium of claim 15, wherein sending the payload further comprises sending the payload to a buffer at the second PCIe I/O device.

* * * * *